US012789259B2

(12) United States Patent
Liu et al.

(10) Patent No.: US 12,789,259 B2
(45) Date of Patent: Nov. 10, 2026

(54) ONLINE MONITORING DEVICE FOR INTERNAL DEFECTS IN METAL SELECTIVE LASER MELTING

(71) Applicant: North University of China, Taiyuan (CN)

(72) Inventors: Bin Liu, Taiyuan (CN); Zhen Zhang, Taiyuan (CN); Wei Chen, Taiyuan (CN); Zhonghua Li, Taiyuan (CN); Peikang Bai, Taiyuan (CN)

(73) Assignee: North University of China, Taiyuan (CN)

( * ) Notice: Subject to any disclaimer, the term of this patent is extended or adjusted under 35 U.S.C. 154(b) by 367 days.

(21) Appl. No.: 18/597,837

(22) Filed: Mar. 6, 2024

(65) Prior Publication Data

US 2025/0025941 A1 Jan. 23, 2025

(30) Foreign Application Priority Data

Jul. 19, 2023 (CN) ......................... 202310886820.4

(51) Int. Cl.
*B22F 10/80* (2021.01)
*G06T 7/00* (2017.01)
(Continued)

(52) U.S. Cl.
CPC ............ *B22F 10/80* (2021.01); *G06T 7/0008* (2013.01); *G06V 10/764* (2022.01);
(Continued)

(58) Field of Classification Search
CPC ......... B33Y 10/00; B33Y 30/00; B33Y 50/00; B33Y 50/02; B22F 10/28; B22F 10/36;
(Continued)

(56) References Cited

U.S. PATENT DOCUMENTS 5,249,143 A * 9/1993 Staley, III ............ G01R 1/0416 702/91
10,724,999 B2 * 7/2020 Cybulsky ........... G01N 29/4427
(Continued)

OTHER PUBLICATIONS

Unknown Author, Razorplus Express, Acquitek, Jul. 21, 2019 (Year: 2019).*
(Continued)

*Primary Examiner* — Kyle R Quigley
(74) *Attorney, Agent, or Firm* — Workman Nydegger

(57) ABSTRACT

An online monitoring device for internal defects in metal selective laser melting is proposed, the online monitoring device includes a metal selective laser melting system, a signal acquisition system, and a signal processing system, the metal selective laser melting system realizes a three-dimensional (3D) printing of metal members and prints metal members with different types or levels of defects; the signal acquisition system is connected with the metal selective laser melting system, and is configured to acquire an acoustic emission signal in the 3D printing process of the metal members; the signal processing system is connected with the signal acquisition system, and is configured to extract characteristic parameters, establish a machine learning model, and discriminate and classify unknown signals in a printing process through using the machine learning model, so as to realize online monitoring of internal defects in the metal selective laser melting system.

5 Claims, 6 Drawing Sheets

(51) Int. Cl.
*G06V 10/764* (2022.01)
*G06V 10/778* (2022.01)
*B33Y 50/00* (2015.01)

(52) U.S. Cl.
CPC ............ *G06V 10/778* (2022.01); *B33Y 50/00* (2014.12); *G06T 2207/10132* (2013.01); *G06T 2207/30136* (2013.01)

(58) Field of Classification Search
CPC .......... B22F 10/38; B22F 10/80; B22F 10/85; B22F 12/90
See application file for complete search history.

(56) References Cited

U.S. PATENT DOCUMENTS

2003/0200188 A1* 10/2003 Moghaddam ......... G06F 18/214 706/12
2008/0188752 A1* 8/2008 Randall .................. A61B 8/463 600/455
2009/0222390 A1* 9/2009 Yuta ....................... G06N 20/00 706/13
2018/0036964 A1* 2/2018 DehghanNiri ..... G01N 27/9013
2019/0049939 A1* 2/2019 Kato .................. G05B 23/0205
2019/0160529 A1* 5/2019 Silidker .................. B22F 3/003
2019/0201978 A1* 7/2019 Oftedal ................... B22F 12/10
2019/0227097 A1* 7/2019 Sadeghian Marnani .................... G01N 29/041
2020/0164578 A1* 5/2020 Morganson ............ B33Y 50/02
2020/0166482 A1* 5/2020 Gold .................... G01N 29/223
2020/0376600 A1* 12/2020 Aggarwal .............. B23K 26/34
2021/0334685 A1* 10/2021 Anahid ................... B22F 10/80
2021/0365016 A1* 11/2021 Hasanian .............. B29C 64/393
2022/0042924 A1* 2/2022 Beckett ................... B22F 10/38
2022/0288845 A1* 9/2022 Norfolk ........... G06Q 10/06395
2022/0408673 A1* 12/2022 Penn ...................... A01G 31/02
2023/0037200 A1* 2/2023 McNamara ............ B33Y 80/00
2023/0078977 A1* 3/2023 Cloots ..................... B22F 12/80 425/73
2023/0181121 A1* 6/2023 Varadan ................. G16H 50/30 600/301
2023/0204481 A1* 6/2023 Li .......................... G01N 29/14 73/587
2024/0139815 A1* 5/2024 Aoyagi ................. B29C 64/393
2024/0165885 A1* 5/2024 Schiffres ................ G01N 29/46
2024/0351136 A1* 10/2024 O'Dowd .............. B23K 26/032

OTHER PUBLICATIONS

Jin et al., Modeling and Analysis of Data-Driven Systems through Computational Neuroscience Wavelet-Deep Optimized Model for Nonlinear Multicomponent Data Forecasting, Computational Intelligence and Neuroscience, 2021 (Year: 2021).*

* cited by examiner

ONLINE MONITORING DEVICE FOR INTERNAL DEFECTS IN METAL SELECTIVE LASER MELTING

CROSS-REFERENCE TO RELATED APPLICATION

This patent application claims the benefit and priority of Chinese Patent Application No. 202310886820.4 filed with the China National Intellectual Property Administration on Jul. 19, 2023, the disclosure of which is incorporated by reference herein in its entirety as part of the present application.

TECHNICAL FIELD

The present disclosure belongs to the technical field of additive manufacturing, in particular to an online monitoring device for internal defects in metal selective laser melting.

BACKGROUND

Additive manufacturing technology, also known as three-dimensional (3D) printing technology, is a technology constructing entities through layer-by-layer printing with adhesive materials such as powder plastics based on a digital model file. Selective laser melting (SLM) is the most widely used 3D printing technology in additive manufacturing of metal materials. By using a laser beam as an energy source, metal powder is sliced according to a model of three-dimensional drawing software (such as CAD and Solidworks) and is scanned layer-by-layer according to a planned path in the slicing model, the metal powder is rapidly melted and solidified, and finally a metal product with good mechanical properties is obtained.

External defects and internal defects may be arisen in selective laser melting and printing processes. External defects (such as warped edges and faults) are easy to be found, while internal defects (such as pores and cracks) are difficult to be found. At present, main problems in online monitoring of defects arisen in selective laser melting process are as follows: traditional penetration testing and magnetic particle testing can only detect surface defects of members; small defects cannot be accurately captured by visual tests such as cameras and video cameras; ultrasonic testing and radiographic testing cannot detect dynamic defects (such as formation of pores and propagation of cracks). Acoustic emission technology can be used for online monitoring of internal dynamic defects in the printing process, so that the defects can be detected when they are arisen. At present, the main problems in online monitoring of the internal defects in a workpiece during the selective laser melting and printing processes with the acoustic emission technology are as follows. (1) The position where a signal is acquired by a sensor is far from a forming area, which will lead to distortion of the obtained signal. (2) Most researchers generally only analyze common acoustic emission parameters, and use variation of a single parameter to characterize the defects in the printing process. Some researches only classify types of the defects based on statistical analysis of parameters, and number of features extracted from acoustic emission signals is limited, which will have an impact on final identification. (3) Amount of data referenced in the constructed defect database is limited, which leads to low accuracy in defect identification and failure of automatic defect identification.

SUMMARY

The purpose of the present disclosure is to solve the problems in the prior art, and to provide an online monitoring device for internal defects in metal selective laser melting. In the present disclosure, an emission sensor is embedded at a bottom of a printed substrate to obtain a complete and clear printing signal; different characteristic parameters are extracted, a linear discriminant analysis method is used to synthesize different types of defects for machine learning, a defect database is established, and automatic identification of defects is realized; and the identified defect model is further integrated into the defect database to increase accuracy of subsequent judgments.

The present disclosure is realized through the following technical solution.

An online monitoring device for internal defects in metal selective laser melting includes a metal selective laser melting system, a signal acquisition system, and a signal processing system. The metal selective laser melting system is configured for realizing a three-dimensional (3D) printing of metal members, and printing the metal members with different types or levels of defects. The signal acquisition system is connected with the metal selective laser melting system, and configured for acquiring acoustic emission signals in the 3D printing process of the metal members. The signal processing system is connected with the signal acquisition system, and is configured for extracting characteristic parameters, establishing a machine learning model, and discriminating and classifying unknown signals in the printing process through the machine learning model (linear discriminant analysis), so as to realize online monitoring of internal defects in the metal selective laser melting system.

Further, the metal selective laser melting system comprises a formed sealing chamber. An optical fiber laser is arranged outside a chamber wall at one side of the formed sealing chamber. A beam expander, a focusing system, a scanning galvanometer, and a lens are arranged inside the formed sealing chamber. An exit end of the optical fiber laser is aligned with an incident end of the beam expander, an exit end of the beam expander is aligned with an incident end of the focusing system, an exit end of the focusing system is aligned with an incident end of the scanning galvanometer, and an exit end of the scanning galvanometer is aligned with an incident end of the lens. A vacuum pump, an argon protection device, and a water cooling box are connected to a chamber wall at another side of the formed sealing chamber. A powder feeding cylinder, a forming cylinder, and a residual powder cylinder are arranged at a bottom of the formed sealing chamber. Lifting platforms are arranged at bottoms of both the powder feeding cylinder and the forming cylinder. A substrate is arranged inside the forming cylinder, and the substrate is located below the lens and is aligned with an exit end of the lens. A preheating device and a temperature sensor are arranged below the substrate. A powder receiving container is connected to a bottom of the residual powder cylinder. An air pressure sensor, a humidity sensor, and an oxygen content sensor are arranged at a top of the formed sealing chamber. A scraper is arranged at the bottom of the formed sealing chamber adjacent to the powder feeding cylinder.

Further, the signal acquisition system comprises two identical acoustic emission sensors, a preamplifier, and a dual-channel acoustic emission acquisition card. One of the acoustic emission sensors is a working acoustic emission sensor and embedded at the bottom of the substrate, and another of the acoustic emission sensors is a guard acoustic emission sensor and fixed on an outer chamber wall at one side of the formed sealing chamber. Both the two acoustic emission sensors are connected with the preamplifier, and the preamplifier is connected with the dual-channel acoustic emission acquisition card.

Further, a broadband differential sensor with a resonance frequency of 500 KHz, and a working frequency in range of 100 KHz to 1000 KHz is provided as the acoustic emission sensor. A 2/4/6-type preamplifier providing amplification gains of 20 dB, 40 dB, and 60 Db is provided as the preamplifier. The dual-channel acoustic emission acquisition card is configured with a sampling rate of 10 M/s per channel, a sampling accuracy of 16 bit, low system noise and high dynamic range, and a waveform buffer of 1 Gb.

Further, the signal processing system is consisted of an acoustic emission characteristic parameter extraction system built into a personal computer (PC), and a machine learning model. Characteristic parameters extracted by the acoustic emission characteristic parameter extraction system comprise time-domain characteristic parameters, frequency-domain characteristic parameters, wavelet characteristic parameters, and quantitative recursive characteristic parameters. The machine learning model processes the characteristic parameters extracted comprehensively through a linear discriminant analysis method.

Further, the time-domain characteristic parameters comprise ringing count (C), amplitude (R), and absolute energy (Ae). The frequency-domain characteristic parameters are obtained through fast Fourier transform to obtain a frequency-domain spectra corresponding to time-domain signals, and a root mean square frequency (Rf) and a peak frequency (Pf) are extracted. The wavelet characteristic parameters are obtained through performing 8-layer wavelet decomposition on the acquired signals using a db3 function (Bessie Extreme Phase Wavelet), in which d1, d2 and d3 represent short-time events, and d4, d5, d6, d7 and d8 represent medium to long-time events. The quantitative recursive characteristic parameters comprise recursion rate (R), certainty rate (D), Shannon entropy (E), and average diagonal length (Lmean).

Further, discriminant mechanism of the linear discriminant analysis method is as follows: giving a training sample set, projecting samples on a straight line, so that projection points of samples of a same type are as close as possible and projection points of samples of different types are as far away as possible; when classifying new samples, projecting them onto a same straight line, and then determining categories of the new samples according to positions of the projection points.

Further, the metal members with different types or levels of defects are prepared through adjusting the printing process.

Further, the signals from the metal members with different types or levels of defects are acquired and put into the machine learning model (linear discriminant analysis method) to classify and identify the defects.

The principle of detecting the defects through the acoustic emission sensors is as follows. The phenomenon that when members are deformed or broken through an external force or an internal force in the printing process, and various types of defects are arisen, strain energy is released in the form of elastic waves, is referred to as acoustic emission. Acoustic emission is a common physical phenomenon. If the released strain energy is large enough, audible sound can be produced. Therefore, when metal materials are plastically deformed, broken, or various types of defects are arisen, acoustic emission will be occurred. However, intensity of acoustic emission signals of most metal materials is too weak to be heard directly, so that the acoustic emission signals need to be detected by acoustic emission sensors. In order to achieve this purpose, the present disclosure provides the online monitoring device for internal defects in metal selective laser melting, in which the output ends of the two acoustic emission sensors are connected with the input end of the preamplifier through coaxial cables, the output end of the preamplifier is connected with the input end of the dual-channel acoustic emission acquisition card, and the output end of the dual-channel acoustic emission acquisition card is connected with the input end of the PC. The defects in target members are monitored, and the original signals in the printing process are acquired through the acoustic emission sensor (working acoustic emission sensor) embedded at the bottom of the substrate, including signals produced by internal operations, such as start and stop of the laser, action of the scraper, lifting and lowering of the forming cylinder and the powder feeding cylinder, and flow of protective gas in the printing process, so as to eliminate the influence of the internal operations. Environmental signals are acquired by the acoustic emission sensors (guard acoustic emission sensor) attached to the chamber wall of the formed sealing chamber to eliminate the influence of the external environment. The defect database is established, members without defects and with various types or levels of defects (such as pores and cracks) are printed by adjusting printing parameters, and their signals are acquired. The signals without defects and signals with various defects which have been acquired are put into the dual-channel acoustic emission acquisition card to obtain the time-domain characteristic parameters, frequency-domain characteristic parameters, wavelet characteristic parameters, and recursive characteristic parameters in the signals. In the process of analyzing the characteristic parameters, the linear discriminant analysis method is used to establish the model for classification of the characteristic parameters, that is, the machine learning model, the defects produced through adjusting the printing parameters are judged, identified, and trained, and the defect database is constructed. The classified characteristic parameters and the established defect database are used to identify the types of defects.

Compared with the prior art, the present disclosure achieves the following beneficial effects.

1) The working acoustic emission sensor is embedded at the bottom of the substrate, so that the signals acquired in the printing process are more complete and clearer.
2) The influence of external environment is eliminated by the guard sensor, and online monitoring of the printing process can still be carried out in noisy environment.
3) Through the linear discriminant analysis method, more characteristic parameters are integrated, so that more characteristic parameters are analyzed and the accuracy of identifying the types of defects is increased.
4) By means of the machine learning model, the determined types of defects and the parameter models are further integrated into the defect database, so that the defect database is more complete and the accuracy of subsequent discrimination is increased.

In the figures: 1—fiber laser; 2—beam expander; 3—focusing system; 4—scanning galvanometer; 5—lens; 6—air pressure sensor; 7—humidity sensor; 8—oxygen content sensor; 9—vacuum pump; 10—argon protection device; 11—water cooling box; 12—scraper; 13—powder feeding cylinder; 14—powder feeding cylinder lifting platform; 15—forming cylinder; 16—substrate; 17—temperature sensor; 18—forming cylinder lifting platform; 19—preheating device; 20—working acoustic emission sensor; 21—formed workpiece; 22—powder receiving container; 23—residual powder cylinder; 24—guard acoustic emission sensor; 25—preamplifier; 26—dual-channel acoustic emission acquisition card; 27—PC; 28—formed sealing chamber.

DETAILED DESCRIPTION OF THE EMBODIMENTS

The present disclosure will be described in further detail hereinafter.

3D printing is a new type of additive manufacturing method, which is different from traditional machining, such as cutting and other subtractive manufacturing, in the aspects of the basic principle, the types and positions of defect in the obtained workpiece. Therefore, in order to achieve a better monitoring effect, the theory needs to be verified repeatedly. In experiments, sensors are installed and debugged, data from various module are compared and analyzed, and appropriate hardware device model, installation solution and optimal parameter analysis method are obtained.

Figure 1:
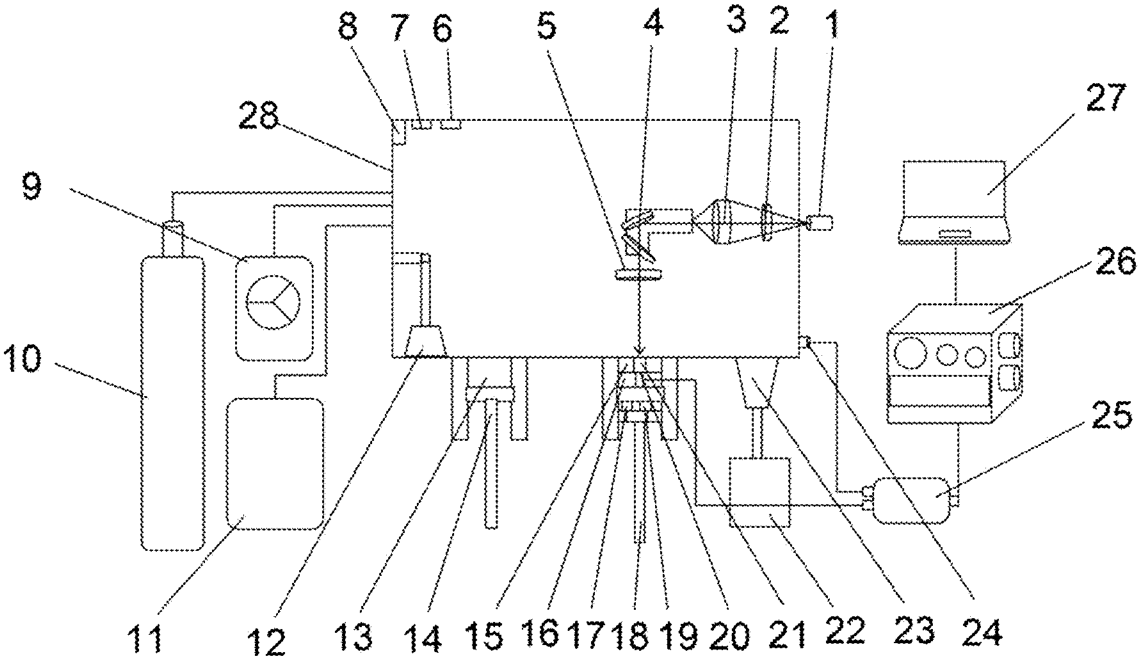
FIG. 1 is a schematic diagram of a structure of a device according to the present disclosure.

As shown in FIG. 1, an online monitoring device for internal defects in metal selective laser melting, comprising a metal selective laser melting system, a signal acquisition system, and a signal processing system. The metal selective laser melting system is configured for realizing a three-dimensional (3D) printing of metal members and printing the metal members with different types or levels of defects. The signal acquisition system is connected with the metal selective laser melting system, and is configured for acquiring acoustic emission signals in the 3D printing process of the metal members. The signal processing system is connected with the signal acquisition system, and is configured for extracting characteristic parameters, establishing a machine learning model, and discriminating and classifying unknown signals in the printing process through the machine learning model, so as to realize online monitoring of internal defects in the metal selective laser melting system.

Figure 3:
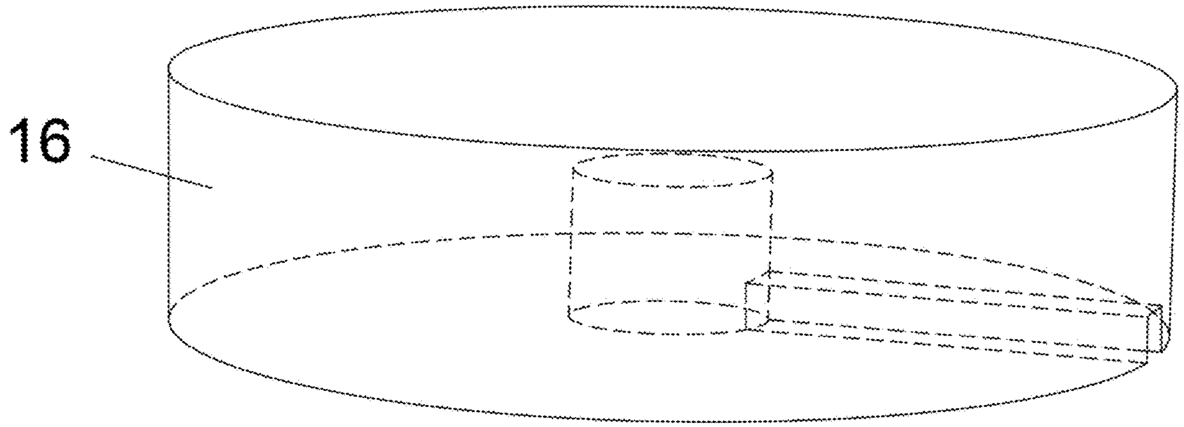
FIG. 3 is a schematic diagram of a three-dimensional structure of a substrate in a device according to the present disclosure.

The metal selective laser melting system comprises a formed sealing chamber 28. An optical fiber laser 1 is arranged outside a chamber wall at one side of the formed sealing chamber 28. A beam expander 2, a focusing system 3, a scanning galvanometer 4, and a lens 5 are arranged in the formed sealing chamber 28. An exit end of the optical fiber laser 1 is aligned with an incident end of the beam expander 2, an exit end of the beam expander 2 is aligned with an incident end of the focusing system 3, an exit end of the focusing system 3 is aligned with an incident end of the scanning galvanometer 4, an exit end of the scanning galvanometer 4 is aligned with an incident end of the lens 5. A vacuum pump 9, an argon protection device 10, and a water cooling box 11 are connected to a chamber wall at another side of the formed sealing chamber 28. A powder feeding cylinder 13, a forming cylinder 15, and a residual powder cylinder 23 are arranged at a bottom of the formed sealing chamber 28. A powder feeding cylinder lifting platform 14 is arranged at a bottom of the powder feeding cylinder 13, and a forming cylinder lifting platform 18 is arranged at a bottom of the forming cylinder 15. A substrate 16 is arranged inside the forming cylinder 15, and the substrate 16 is located below the lens 5 and is aligned with an exit end of the lens 5. Structure of the substrate 16 is shown in FIG. 3, and grooves are arranged at a bottom surface of the substrate for embedding acoustic emission sensors. A preheating device 19 and a temperature sensor 17 are arranged below the substrate 16. A powder receiving container 22 is connected to a bottom of the residual powder cylinder 23. An air pressure sensor 6, a humidity sensor 7, and an oxygen content sensor 8 are arranged at a top of the formed sealing chamber 28. A scraper 12 is arranged at the bottom of the formed sealing chamber 28 adjacent to the powder feeding cylinder 13.

Figure 2:
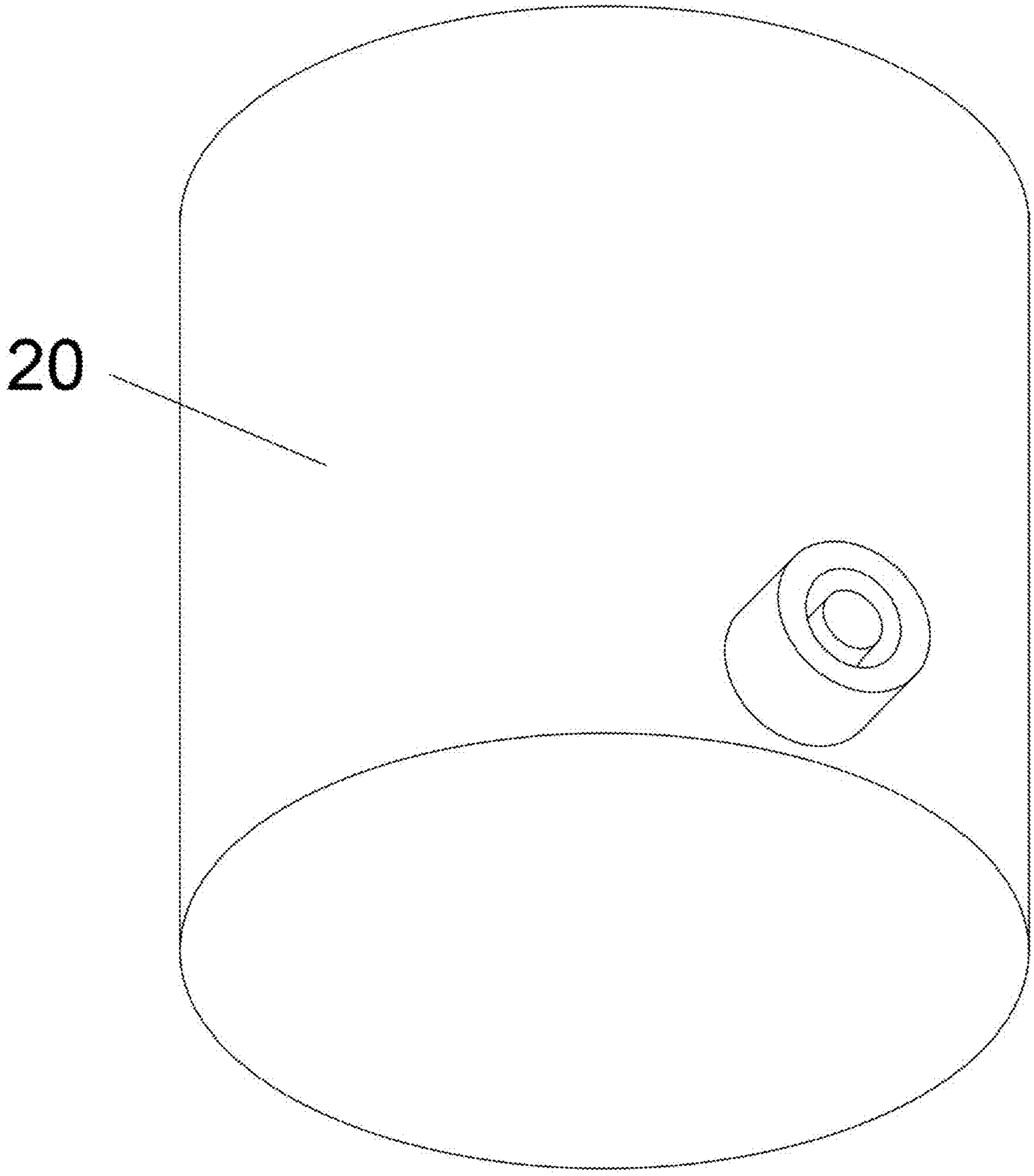
FIG. 2 is a schematic diagram of a three-dimensional structure of an acoustic emission sensor in a device according to the present disclosure.
Figure 4:
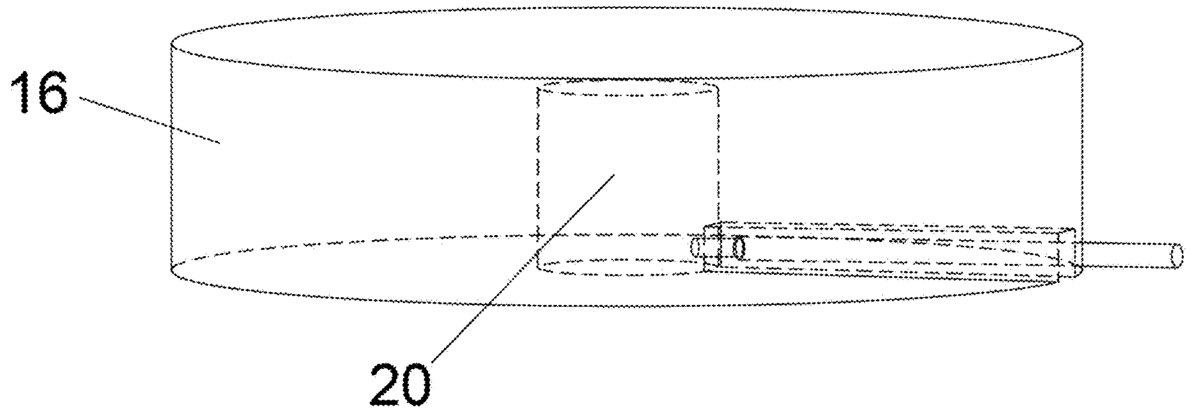
FIG. 4 is a schematic diagram of installation of a working acoustic emission sensor and a substrate in a device according to the present disclosure.

The signal acquisition system comprises two identical acoustic emission sensors, a preamplifier 25 and a dual-channel acoustic emission acquisition card 26, and the structure of the acoustic emission sensor is shown in FIG. 2. One of the acoustic emission sensors is a working acoustic emission sensor 20 and embedded at a groove of the bottom of the substrate, as shown in FIG. 4, and another of the acoustic emission sensors is a guard acoustic emission sensor 24 and fixed on an outer chamber wall at one side of the formed sealing chamber 28. Both the two acoustic emission sensors are connected with the preamplifier 25, and the preamplifier 25 is connected with the dual-channel acoustic emission acquisition card 26. A broadband differential sensor with a resonance frequency of 500 KHz and a working frequency in range of 100 KHz to 1000 KHz is provided as the acoustic emission sensor. A 2/4/6-type preamplifier providing amplification gains of 20 dB, 40 dB and 60 dB is provided as the preamplifier 25. The dual-channel acoustic emission acquisition card 26 is configured with a sampling rate of 10 M/s per channel, a sampling accuracy of 16 bit, low system noise and high dynamic range, and a waveform buffer of 1 Gb.

The signal processing system is consisted of an acoustic emission characteristic parameter extraction system built into a personal computer (PC) 27, and a machine learning model. Characteristic parameters extracted by the acoustic emission characteristic parameter extraction system comprise time-domain characteristic parameters, frequency-domain characteristic parameters, wavelet characteristic parameters, and quantitative recursive characteristic parameters.

The time-domain characteristic parameters comprise ringing count (C), amplitude (R), and absolute energy (Ae). The frequency-domain characteristic parameters are obtained through fast Fourier transform to obtain a frequency-domain spectra corresponding to time-domain signals, and a root mean square frequency (Rf) and a peak frequency (Pf) are extracted. The wavelet characteristic parameters are obtained through performing 8-layer wavelet decomposition on the acquired signals using a db3 function (Bessie Extreme Phase Wavelet), in which d1, d2 and d3 represent short-time events, and d4, d5, d6, d7 and d8 represent medium to long-time events. The quantitative recursive characteristic parameters comprise recursion rate (R), certainty rate (D), Shannon entropy (E), and average diagonal length (Lmean).

The machine learning model is a linear discriminant analysis method, which processes the characteristic parameters extracted comprehensively through linear discriminant analysis, and discriminant mechanism of the linear discriminant analysis method is as follows: giving a training sample set, projecting samples on a straight line, so that projection points of the samples of the same type are as close as possible and projection points of samples of different types are as far away as possible; when classifying new samples, projecting them onto the same straight line, and then determining categories of new samples according to the positions of the projection points.

The metal members with different types or levels of defect are prepared through adjusting the printing process, and the signals from the metal members with different types or levels of defects are acquired and put into the machine learning model to classify and identify the defects.

The working mode of the device of the present disclosure is as follows.

1) The model and its data processing: first, a three-dimensional image of the member to be printed is drawn in three-dimensional software (such as CAD and Solidworks), the image is exported in STL file format, the three-dimensional image is sliced in slicing software (such as Cura and Simplify3D), the thickness of each layer of the image and its scanning path are prefabricated, and the image is imported into the device for printing.
2) Printing operation: the powder feeding cylinder 13 contains 316L stainless steel powder. The powder feeding cylinder lifting platform 14 rises to lift a layer of 316L stainless steel powder with a layer of slice thickness. The forming cylinder 15 lifts a layer of slice thickness through the forming cylinder lifting platform 18. The scraper 12 pushes the 316L stainless steel powder sent upward from the powder feeding cylinder 13 to the surface of the substrate 16 from left to right, and the preheating device 20 below the substrate 16 starts heating. The 316L stainless steel powder on the substrate 16 is preheated to 110° C., and the temperature is monitored by the temperature sensor 17. The scraper 12 pushes the excess 316L stainless steel powder into the powder residue cylinder 23, and then the scraper 12 returns to the original position from right to left to scrape the 316L metal powder on the substrate 16 evenly, thus the powder feeding operation is completed. After the powder is fed, the laser emitted by the laser transmitter 1 sequentially scans this layer through the beam expander 2, the focusing system 3, the scanning galvanometer 4, and the lens 5 according to a predetermined path. After scanning one layer, the powder feeding operation is sequentially performed before scanning the next layer, and the cycle is repeated until the formed workpiece 21 has been printed.

The vacuum pump 9 extracts air from the printer chamber, and the output pressure of the argon protection device 10 is 0.5 MPa, which is used to reduce the oxygen content in the formed sealing chamber 28 in the printing process. The water pipes of the water cooling box 11 are distributed throughout each part of the device, with the working flow of 1.7 GPM, which is used to reduce the temperature of the formed sealing chamber 28 and each part in the printing process. The air pressure sensor 6 monitors that the pressure in the formed sealing chamber 28 is 0.3 mbar in the printing process. The humidity sensor 7 monitors that the environmental humidity in the formed sealing chamber 28 is 14.4 RH % in the printing process. The oxygen content sensor 8 monitors that the oxygen concentration in the formed sealing chamber 28 is lower than 0.02% in the printing process.

The sensitivity of the acoustic emission sensor is more than 65 dB, and the temperature is in range of −20° C.~120° C. It is particularly important to note that the interior of the groove in the substrate 16 of the working acoustic emission sensor 20 and the outer chamber wall contacting with the guard acoustic emission sensor 24 should be kept locally clean, and vacuum grease should be applied between the acoustic emission sensor and the contact surface to ensure the sealing between the contact surfaces and the integrity of signal transmission, so that the original information in the printing process and the external environmental signals acquired on the outer chamber wall of the formed sealing chamber 28 can be acquired more completely.

The preamplifier 25 is a 2/4/6-type amplifier with differential input ports: the output ends of the working acoustic emission sensor 20 and the guard acoustic emission sensor 24 are connected with the differential input end of the preamplifier 25, and the gain of the preamplifier 25 is set at 60 dB level.

The input end of the dual-channel acoustic emission acquisition card 26 is connected with the output end of the preamplifier 25. First, the signals produced through the internal operation of the formed sealing chamber 28 are acquired, including the signals produced through the start and stop of the laser transmitter 1, the signals produced through the lifting of the powder feeding cylinder lifting platform 14, the signals produced through the lowering of the forming cylinder lifting platform 18, the signals produced through the scraper 12 returning to its original position from left to right and from right to left, the gas flow signals after the argon protection device 10 is turned on, and the noise signals produced during stable operation of the vacuum pump 9 and the water cooling box 11.

A defect database is build.

1) The printing parameters are adjusted to print 316L stainless steel members with different levels of pores.

Figure 5A:
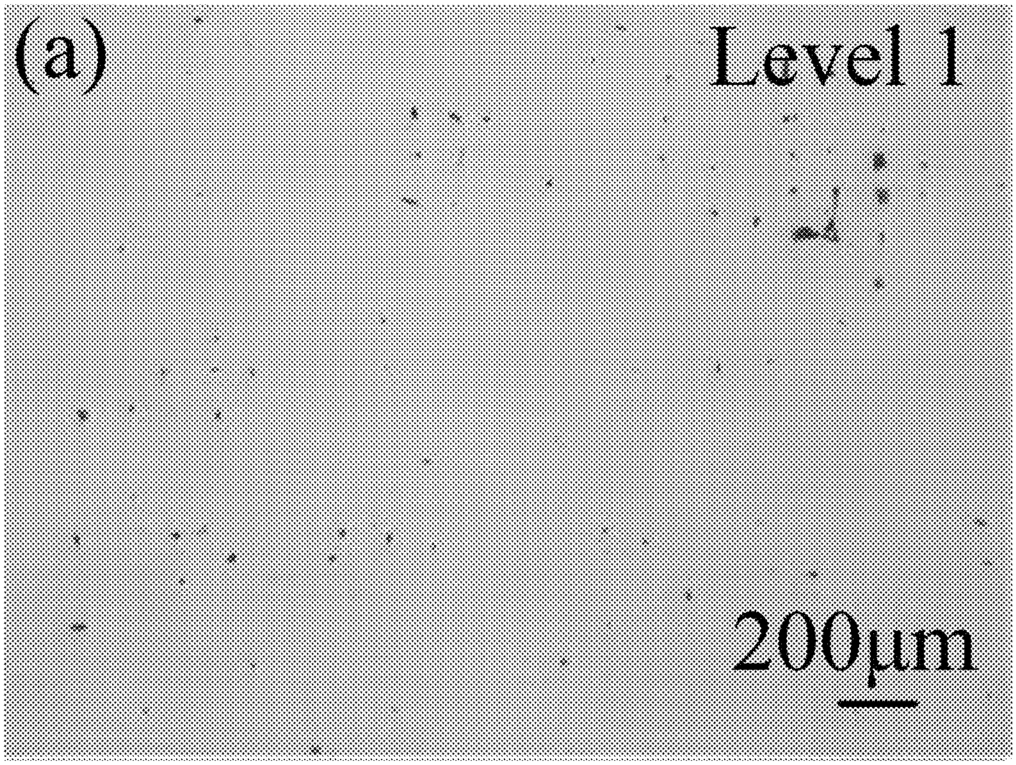
FIG. 5A to 5D are hole diagrams of horizontal members with different pores.

SLM parameter 1: In case that the laser power is 180 W, the scanning speed is 1200 mm/s, the scanning interval is 0.1 mm, and the layer thickness is 0.03 mm, the performance the obtained 316L stainless steel is poor. After cutting, grinding, polishing and, etching the members, there are a lot of holes under a light microscope, as shown in FIG. 5A. The level of pores is Level 1, which means there are many holes.

Figure 5B:
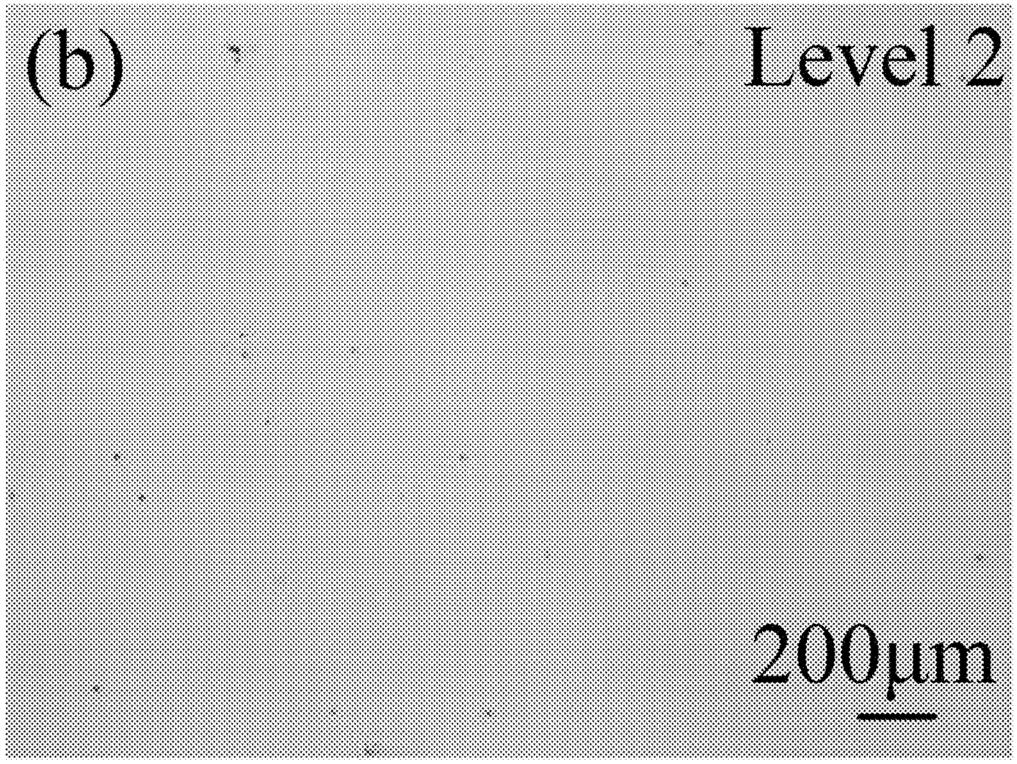

SLM parameter 2: In case that the laser power is 180 W, the scanning speed is 900 mm/s, the scanning interval is 0.1 mm, and the layer thickness is 0.03 mm, the performance of the obtained 316L stainless steel is good. After cutting, grinding, polishing, and etching the members, there are a few holes under the light microscope, as shown in FIG. 5B. The level of pores is Level 2, which means there are a few holes.

Figure 5C:
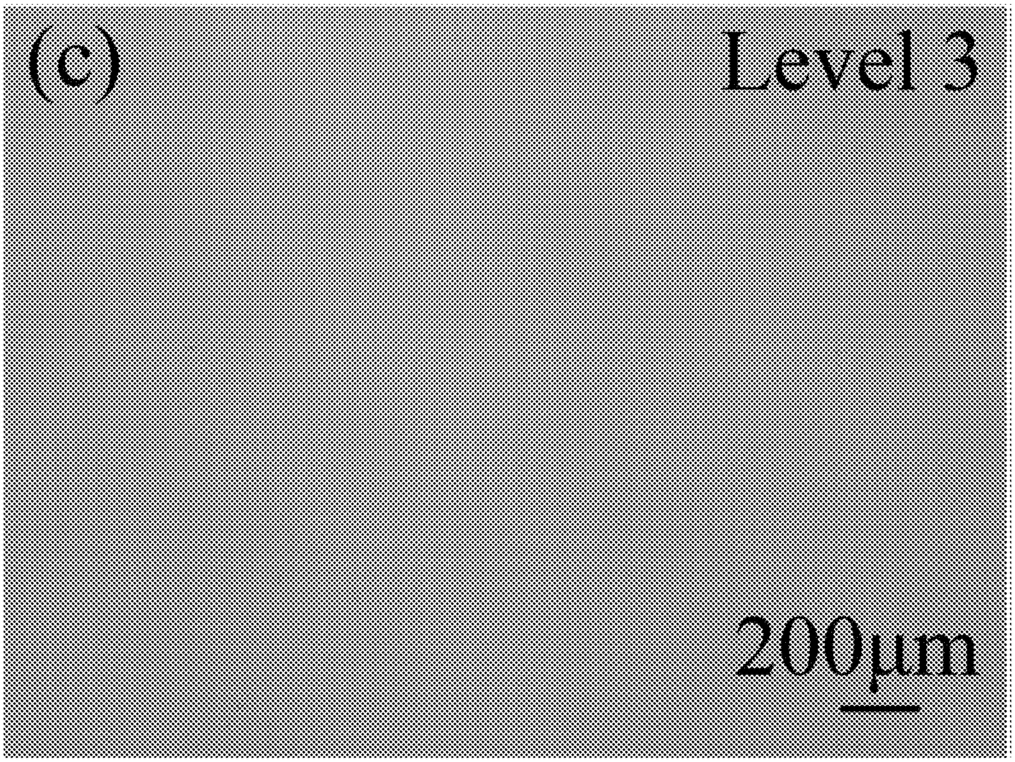

SLM parameter 3: In case that the laser power is 180 W, the scanning speed is 1200 mm/s, the scanning interval is 0.1 mm, and the layer thickness is 0.03 mm, the performance of the obtained 316L stainless steel is excellent. After cutting, grinding, polishing, and etching the members, the structure is compact under the light microscope, as shown in FIG. 5C. The level of pores is Level 3, which means there is no hole.

2) The above printing signals are acquired, and the influence of internal operations and external noise on the signals is removed.
3) The acquired signals are processed by the dual-channel acoustic emission acquisition card 26 to obtain time-domain characteristic parameters, frequency-domain characteristic parameters, wavelet characteristic parameters, and recursive characteristic parameters.
4) The time-domain characteristic parameters include ringing count (C), amplitude (R), and absolute energy (Ae). The frequency-domain characteristic parameters include root mean square frequency (Rf), and peak frequency (Pf). The wavelet characteristic parameters d1, d2 and d3 represent short-time events, and d4, d5, d6, d7 and d8 represent medium to long-time events. The recursive characteristic parameters include recursion rate (R), certainty rate (D), Shannon entropy (E), and average diagonal length ($L_{mean}$).
5) The characteristic parameters of defects are analyzed through the linear discriminant analysis method.
6) In the linear discriminant mechanism, a comprehensive modeling is carried out based on the contribution of characteristic parameters to classification judgment, and finally 17 characteristic parameters are selected: ringing count (C), amplitude (R), absolute energy (Ae), root mean square frequency (Rf), peak frequency (Pf), wavelet characteristic parameters d1, d2, d3, d4, d5, d6, d7, d8, recursion rate (R), certainty rate (D), Shannon entropy (E), and average diagonal length ($L_{mean}$), so as to establish the machine learning model as follows:
$$LDA1=5.112C+0.144R-0.386Ae+0.707Rf-0.32Pf+8.749d1-0.381d2+1.269d3-1.331d4+2.646d5+1.144d6-0.676d7-0.0011d8+5.433R-18.745D-6.06\times 10-3L_{mean}$$
7) A corresponding relationship is established between the machine learning model established based on linear discrimination and different levels of porosity of 316L stainless steel build through adjusting the printing parameters, and a defect database is build.

The defects of the target member are monitored.

Figure 5D:
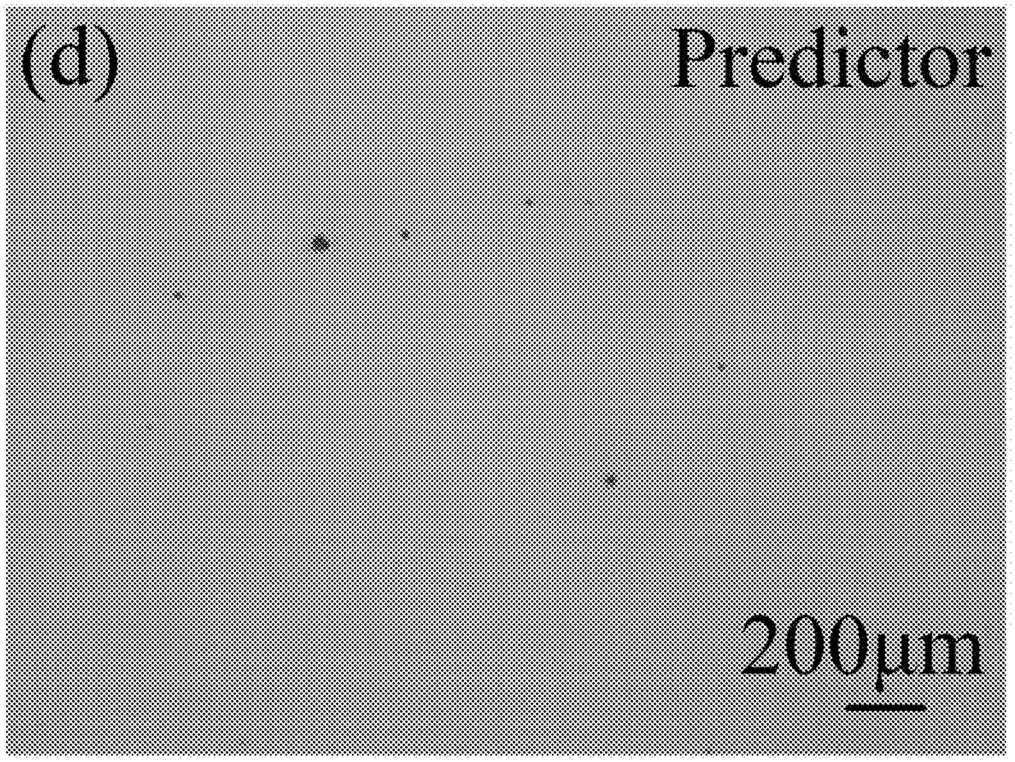
Figure 6:
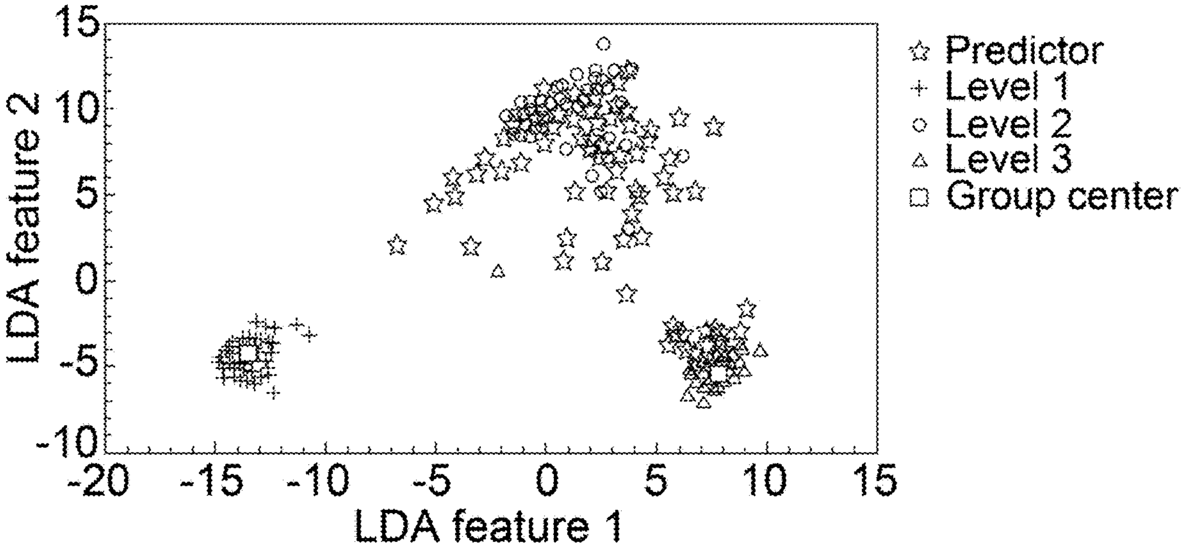
FIG. 6 is a diagram showing results of online monitoring of an acoustic emission signal and a machine learning model of a target member.

1) After the defect database is build, it is ensured that the device can work normally and the target workpiece starts to be printed. The printing parameters for the target workpiece are as follows: the laser power of 150 W, the scanning speed of 850 mm/s, the scanning interval of 0.1 mm, and the layer thickness of 0.03 mm.
2) The signals of the target member in the printing process are acquired by the working acoustic emission sensor 20, and the environmental noise during the printing process of the target member is acquired by the guard acoustic emission sensor 24.
3) The acquired signals are amplified by the preamplifier 25 and are transmitted to the dual-channel acoustic emission acquisition card 26.
4) The signals are processed by the dual-channel acoustic emission acquisition card 26, and time-domain characteristic parameters are extracted. The time-domain characteristic parameters include ringing count (C), amplitude (R), and absolute energy (Ae). The frequency-domain characteristic parameters include root mean square frequency (Rf), and peak frequency (Pf). The wavelet characteristic parameters d1, d2 and d3 represent high-frequency information, and d4, d5, d6, d7 and d8 represent medium to long-time events. The recursive characteristic parameters include recursion rate (R), certainty rate (D), Shannon entropy (E), and average diagonal length ($L_{mean}$).
5) The characteristic parameters are calculated by the established machine learning model.
6) Analysis and classification are performed with the established defect database. The type of defects is predicted to be Level 2 with low porosity, and the prediction diagram is shown in FIG. 6, which is based on the online monitoring results of the acoustic emission signals and the machine learning model.
7) The resulting level of pores Level 2 is displayed on the PC 27.
8) Refer to FIG. 5D for metallographic images taken after cutting, grinding, polishing, and etching the printed target 316L stainless steel member, and the level of pores and the acoustic emission signals are analyzed by adopting the linear discriminant analysis method, and the predicted the level of pores after modelling is verified.

The results show that the discriminant results of internal defects in the selective laser melting printing process monitored through the acoustic emission technology are basically consistent with those of metallographic images.

The content described in the implementation of the present disclosure is only a listing of the implementation forms of the inventive concept, and the scope of protection of the present disclosure should not be limited to the specific forms stated in the examples, the scope of protection of the present disclosure, and equivalent technical means that is conceivable by those skilled in the art according to the inventive concept.

What is claimed is:

1. An online monitoring device for internal defects in metal selective laser melting, comprising a metal selective laser melting system, a signal acquisition system, and a signal processing system; the metal selective laser melting system is configured for realizing a three-dimensional (3D) printing of metal members and printing the metal members with different types or levels of defects; the signal acquisition system is connected with the metal selective laser melting system, and is configured for acquiring acoustic emission signals in the 3D printing process of the metal members; the signal processing system is connected with the signal acquisition system, and is configured for extracting characteristic parameters, establishing a machine learning model, and discriminating and classifying unknown signals in the printing process through the machine learning model, so as to realize online monitoring of internal defects in the metal selective laser melting system, wherein the metal selective laser melting system comprises a formed sealing chamber; an optical fiber laser is arranged outside a chamber wall at one side of the formed sealing chamber; a beam expander, a focusing system, a scanning galvanometer, and a lens are arranged inside the formed sealing chamber; an exit end of the optical fiber laser is aligned with an incident end of the beam expander, an exit end of the beam expander is aligned with an incident end of the focusing system, an exit end of the focusing system is aligned with an incident end of the scanning galvanometer, and an exit end of the scanning galvanometer is aligned with an incident end of the lens; a vacuum pump, an argon protection device, and a water cooling box are connected to a chamber wall at another side of the formed sealing chamber; a powder feeding cylinder, a forming cylinder and a residual powder cylinder are arranged at a bottom of the formed sealing chamber; lifting platforms are arranged at bottoms of both the powder feeding cylinder and the forming cylinder; a substrate is arranged inside the forming cylinder, and the substrate is located below the lens and is aligned with an exit end of the lens; a preheating device and a temperature sensor are arranged below the substrate; a powder receiving container is connected to a bottom of the residual powder cylinder; an air pressure sensor, a humidity sensor, and an oxygen content sensor are arranged at a top of the formed sealing chamber; and a scraper is arranged at the bottom of the formed sealing chamber adjacent to the powder feeding cylinder;

wherein the signal acquisition system comprises two identical acoustic emission sensors, a preamplifier, and a dual-channel acoustic emission acquisition card; one of the acoustic emission sensors is embedded at the bottom of the substrate, and another of the acoustic emission sensors is fixed on an outer chamber wall at one side of the formed sealing chamber; both the two acoustic emission sensors are connected with the preamplifier, and the preamplifier is connected with the dual-channel acoustic emission acquisition card;

wherein the signal processing system is consisted of an acoustic emission characteristic parameter extraction system built into a personal computer (PC) and a machine learning model; the characteristic parameters extracted by the acoustic emission characteristic parameter extraction system comprise time-domain characteristic parameters, frequency-domain characteristic parameters, wavelet characteristic parameters, and quantitative recursive characteristic parameters; and the machine learning model processes the characteristic parameters through a linear discriminant analysis method; and wherein the time-domain characteristic parameters comprise ringing count, amplitude, and absolute energy; the frequency-domain characteristic parameters are obtained through fast Fourier transform to obtain a frequency-domain spectra corresponding to time-domain signals, and a root mean square frequency and a peak frequency are extracted: the wavelet characteristic parameters are obtained through performing 8-layer wavelet decomposition on the acquired signals using a db3 function, in which d1, d2 and d3 represent short-time events, and d4, d5, d6, d7 and d8 represent medium to long-time events; and the quantitative recursive characteristic parameters comprise recursion rate, certainty rate, Shannon entropy, and average diagonal length.

2. The online monitoring device for internal defects in metal selective laser melting according to claim 1, wherein a broadband differential sensor with a resonance frequency of 500 KHz, and a working frequency in range of 100 KHz to 1000 KHz is provided as the acoustic emission sensor; a 2/4/6-type preamplifier providing amplification gains of 20 dB, 40 dB, and 60 dB is provided as the preamplifier; and the dual-channel acoustic emission acquisition card is configured with a sampling rate of 10M/s per channel, a sampling accuracy of 16 bit, and a waveform buffer of 1 Gb.

3. The online monitoring device for internal defects in metal selective laser melting according to claim 1, wherein discriminant mechanism of the linear discriminant analysis method is as follows: giving a training sample set, projecting samples on a straight line, so that projection points of samples of a same type are close and projection points of samples of different types are far away; and when classifying new samples, projecting the new samples onto a same straight line, and then determining categories of the new samples according to positions of the projection points.

4. The online monitoring device for internal defects in metal selective laser melting according to claim 3, wherein the metal members with different types or levels of defects are prepared through adjusting the printing process.

5. The online monitoring device for internal defects in metal selective laser melting according to claim 4, wherein the signals from the metal members with different types or levels of defects are acquired and put into the machine learning model to classify and identify the defects.

* * * * *